Nov. 1, 1966 W. B. BANKS 3,282,084
APPARATUS FOR DETERMINING PHYSICAL PROPERTIES OF MATERIALS
Filed March 5, 1963
3 Sheets-Sheet 1
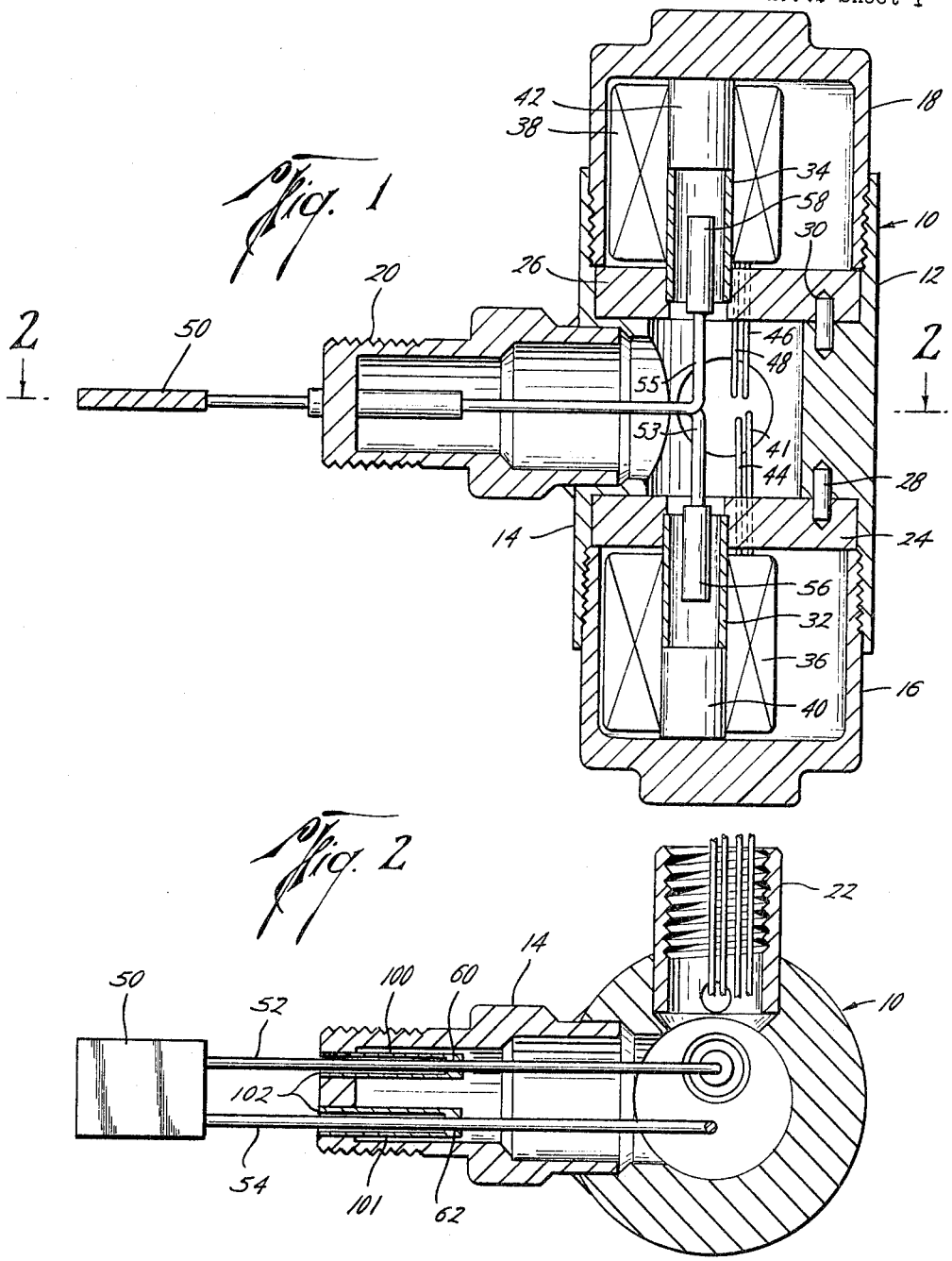
William B. Banks
INVENTOR.

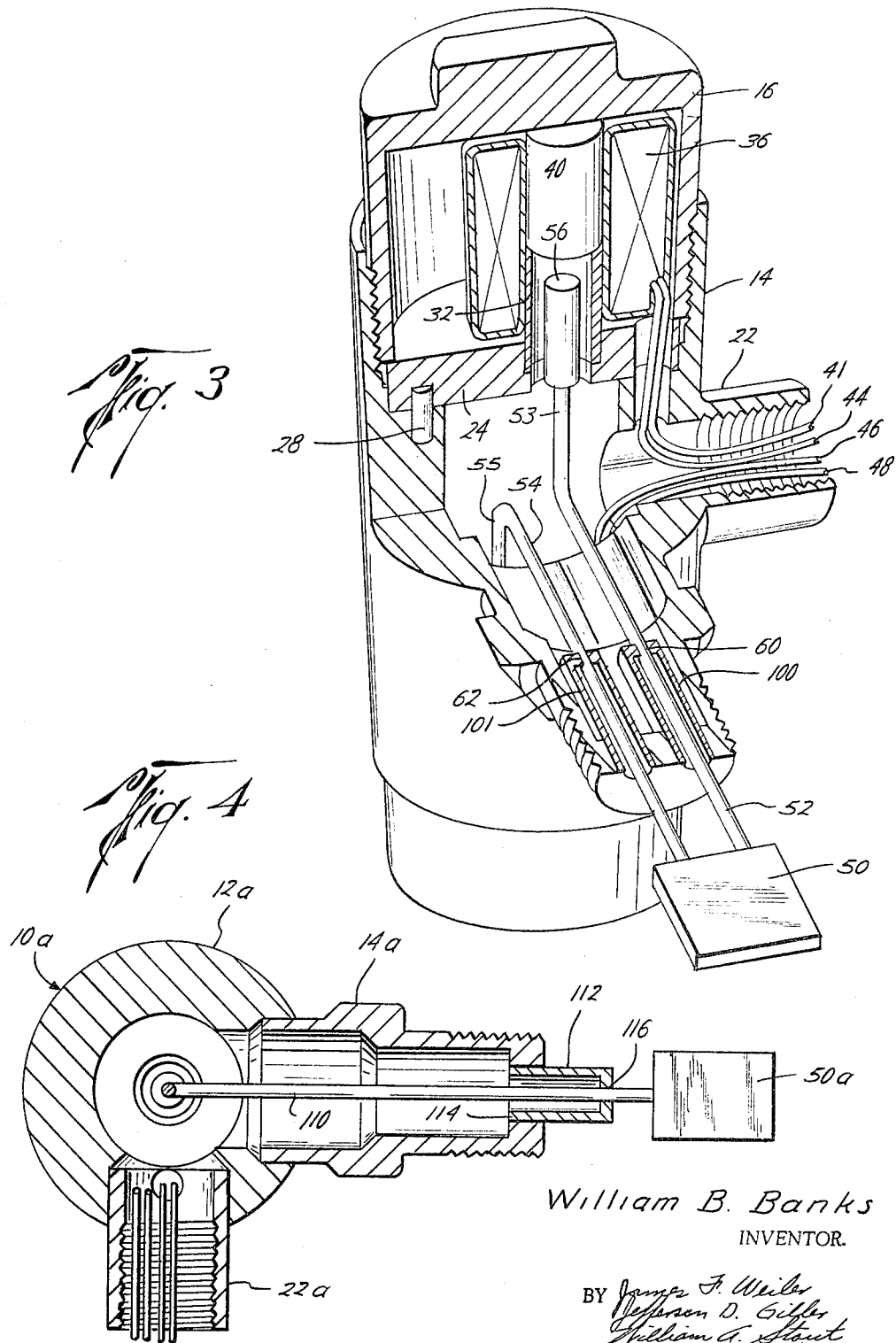

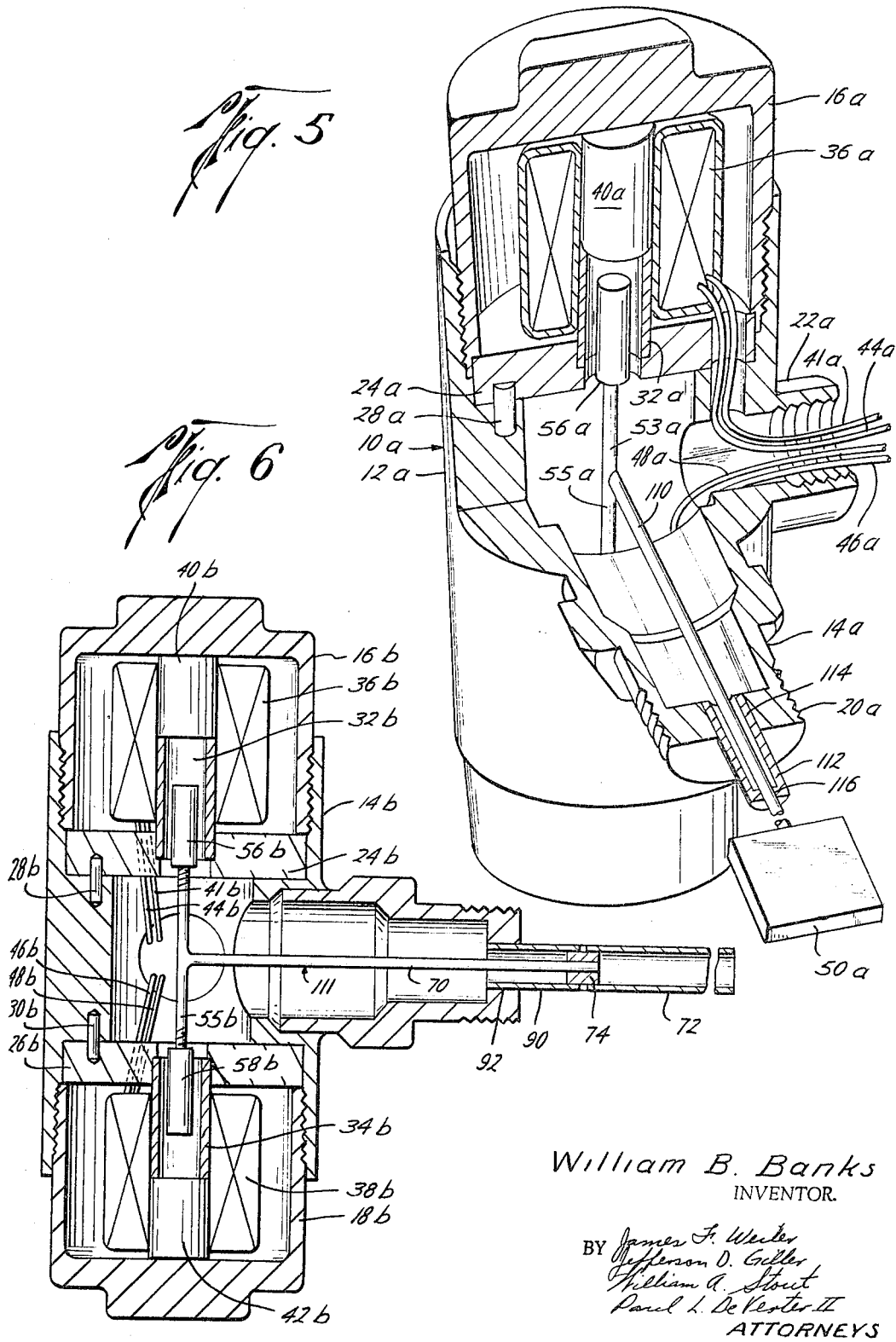

United States Patent Office 3,282,084
Patented Nov. 1, 1966

3,282,084
APPARATUS FOR DETERMINING PHYSICAL
PROPERTIES OF MATERIALS
William B. Banks, Houston, Tex., assignor to Automation Products, Inc., Houston, Tex., a corporation of Texas
Filed Mar. 5, 1963, Ser. No. 263,006
11 Claims. (Cl. 73—32)

This application is a continuation-in-part of my copending patent application entitled Method of and Apparatus for Determining Physical Properties of Materials, Serial No. 705,417, filed December 26, 1957, now Patent No. 3,100,390, and my copending patent application entitled Apparatus for Determining Physical Properties of Materials and Temperature Compensating Circuit, Serial No. 173,230, filed February 14, 1962, now abandoned. The present invention relates to an apparatus for determining physical properties of materials, and more particularly, relates to an apparatus for the indication and/or control of changes or values of physical properties of materials.

This invention is capable of wide general application in connection with the measurement of various physical properties of materials such as density, specific gravity, viscosity, measurement and control of material level, flow, interface, elasticity, and temperature. The apparatus of the present invention may be used with liquids, gases, and movable solids.

The apparatus of the present invention is generally directed to various improvements in a vibratory means having at least one transversely actuated vibratory element, a material contact sensing means connected to one end of the vibratory element whereby upon vibration of the element the vibration is transmitted through the vibratory element and to the material contact sensing means wherein the value or change in a physical property or the material contacting the sensing means is measured or detected by measuring the change in vibration of the vibratory element.

One feature of the present invention is specifically directed to providing an apparatus in which a flexible vibratory element is sealingly supported intermediate its ends in such a manner that high pressures, contaminating or corrosive materials, and other material conditions will not pass the seal, but that transverse vibratory signals may be readily transmitted over the vibratory element.

A still further object of the present invention is to provide an apparatus for determining physical properties of materials having at least one vibratory element which may be positioned through a material enclosure and transversely vibrated, but yet the material and the conditions to which the material is subjected are prevented from escaping through the material enclosure by providing a tubular support member which supports and seals the vibratory element.

A still further object of the present invention is the provision of an apparatus for determining physical properties of materials which includes at least one vibratory element passing through a material enclosure in which a tubular sealing means, which has one end fixedly secured, flexibly supports from its second end the vibratory element at approximately the node point of the element's natural resonant frequency thereby preventing the passage of the materials through the enclosure.

Yet a further object of the present invention is the provision of an apparatus which includes an elongated vibratory element having two vibratory rods longitudinally aligned and connected to form a single elongated vibratory element in which the rods have different natural resonant frequencies whereby more power may be transmitted over the vibratory element.

A still further object of the present invention is the provision of an apparatus for determining physical properties of a material in which the apparatus has at least one vibratory element and in which a flexible tubular support member is positioned co-axially about the transversely actuated vibratory element so that the first end of the tubular support member may be fixedly supported and the second end of the tubular support member is sealably secured to and supports the vibratory element and seals it against high pressures and other ambient material conditions, but is flexible in a transverse direction so as to vibrate and allow the passage of vibratory signals through the vibratory element.

Yet a further object of the present invention is the provision of an apparatus for determining the physical properties of materials by providing two vibratory rods having different natural resonant frequencies, the rods being longitudinally aligned and connected together to form a single elongate vibratory means and providing a tubular sealing support about said means adjacent the node point of one of said vibratory rods.

Yet a still further object of the present invention is the provision of a material contact sensing means which changes size in proportion to changes in temperature and which may therefore be used for detecting changes in the temperature of a material.

Other and further objects, features and advantages will be apparent from the following description of presently preferred embodiments of the invention, given for the purpose of disclosure, and taken in conjunction with the accompanying drawings, where like character references designate like parts throughout the several views, and where, FIGURE 1 is a side elevational view, in cross section, of one embodiment of the present invention showing the details of construction.

FIGURE 2 is a cross section taken along the line 2—2 of FIGURE 1,

FIGURE 3 is a perspective elevational view, partly in section, illustrating the embodiment of the invention shown in FIGURES 1 and 2, FIGURE 4 is a cross-sectional view of another embodiment of the present invention having a single vibratory element, FIGURE 5 is a perspective elevational view, partly in cross section, of the embodiment of the invention shown in FIGURE 4, and FIGURE 6 is a side elevational view, in cross section, of an apparatus similar to the invention of FIGURES 4 and 5, but with a modified type of flexible vibratory element.

The present invention is generally directed to providing at least one transversely and preferably continuously actuated vibratory element which is sealably supported by a flexible tubular support member. A material contact sensing means is connected to the transversely actuated vibratory element on one side of the support, the material contact sensing means being positioned so as to be acted upon by the material to be measured. Means are provided on the second side of the support for transversely and preferably continuously vibrating the vibratory element thereby transmitting vibrations along the element, and to the material contact sensing means. Measuring or detecting means on the second side of the support measure the change in the vibration of the vibratory element thereby indicating the value or changes in the physical properties of the material which is in contact with the material contacting sensing means.

One feature of the present invention is specifically directed to the provision of a flexible tubular support member which while supporting and sealing the transversely vibrated vibratory element will also vibrate transversely to some extent to allow the passage of the vibratory waves through the sealed point of support.

Referring now to the drawings, and to all of the figures, it is noted that generally all of the various embodiments may utilize the same housing, transverse drive vibration means, and pick up or detector means. Therefore, for convenience of reference, the letters "a" and "b" will be applied to the parts corresponding to those in FIGURES 1–3 when referring to the embodiments of FIGURES 4, 5 and 6, respectively. Thus, the reference numeral 10 generally designates an apparatus for determining physical properties of material, and includes a casing or housing 12, which includes a central T-shaped tubular portion 14 and tubular side portions 16 and 18, which for ease of manufacture and maintenance are preferably threadably connected to the central portion 14.

The central tubular portion 14 is preferably internally threaded at its outer end 20 for a threadable and sealable connection within a threaded opening in a material container (not shown) to which the apparatus 10 may be attached and thus maintain the material in the material container under its normal operating pressures and conditions. Also connected to the central tubular portion 14 is an internally threaded connection 22 adapted for threadable attachment to an electrical conduit (not shown) containing the electrical connections to the apparatus, which will be more fully discussed hereinafter.

The electromagnetic motor or transverse drive vibration means assembly is enclosed in and located in the housing end 16. A retaining disk 24, which provides the support for the vibratory assembly, is supported in the central housing portion 14 by dowel pin 28 or other suitable means and secured in place in the end 16. A tubular non-magnetic sleeve 32 is supported in the retaining disk by a counter sunk shoulder and extends into the interior of the end 16. Within the end 16 electro-magnetic coil 36 surrounds and is supported by the tubular sleeve 32. A magnetic core 40 is located within the electromagnetic coil 36 at one end of the non-magnetic sleeve 32. The electrical connections 41 and 44 supply the electrical current from an external source to the electro-magnetic coil 36 which sets up vibrations in a flexible vibratory means which will be more fully described hereinafter.

The detector means or generator assembly is located in the housing end portion 18. A retaining disk 26 provides the support for the detecting means and is secured in the central portion 14 of the housing by a dowel pin 30, and in turn supports a non-magnetic tubular sleeve 34 in the housing end 18. An electro-magnetic coil 38 is enclosed about one end and supported by the non-magnetic tubular sleeve 34. A permanent magnet 42 is disposed in the electro-magnetic coil 38 at one end of the non-magnetic sleeve 34 and thus provides a magnetic field for the coil 38. Connected to the electro-magnetic coil 38 are electrical connections 46 and 48 which carry the current generated in the detecting coil 28 to any suitable electrical indicating or control means. Any suitable electric control or detecting means may be used such as control relays or an indicating volt meter (not shown), all of which are conventional and as such do not constitute part of this invention and no further description is deemed necessary.

Inside of the housing, a magnetic armature 56 extends into the tubular element 32 and vibrates in response to the frequency of the electrical voltage applied to the electrical magnetic coil 36 and transfers that vibration to an extension 53. A magnetic armature 58 is positioned in the tubular element 34 in the detecting assembly and is connected to an extension 55, which when vibrated vibrates the armature 58 thereby causing a voltage in the coil 38 which is a measure of the vibration applied to the extension 55.

Now referring to FIGURES 1 through 3, the vibratory means may consist of two flexible vibratory elements or rods 52 and 54, said rods being attached at one end to the material contact sensing means or paddle 50 and at the second ends to the extensions 53, 55, respectively.

The material contact sensing means or paddle 50 is positioned exteriorly of the housing 12 in order to be positioned to make satisfactory contact with the material to be measured. The flexible vibratory elements 52 and 54 are preferably supported adjacent the node point of their natural resonant frequency so that when the armature 56 is vibrated the flexible element 52 is transversely vibrated, and the vibration will travel longitudinally along the element 52 and pass through its node point thereby vibrating the material sensing means 50. The vibration of paddle 50 is then transmitted to the element 54, through its node point and to armature 58.

However, in attempting to sealingly support the flexible vibratory elements 52 and 54, it is desirable in many cases that the support be sturdy and secure enough so as to enable the material sensing means 50 to be placed in high pressure vessels and measure the physical characteristics of the materials under high pressures or other operating conditions under which the material is desired to be securely contained. However, in attempting to sealingly support the flexible vibratory elements 52 and 54 in a secure manner it has been found that a suitable seal, from a pressure standpoint, must be of such great sturdiness as to impair the passage of vibratory waves along the transversely vibrating flexible elements 52 and 54, even though the sealing support is placed at the node points 60 and 62, respectively, of the natural resonant frequency of the flexible vibratory rods 52 and 54.

The present invention makes use of flexible tubular support means 100 and 101 which are fixedly secured at one end 102 to the central tubular portion 14 and are sealably connected by their free ends to the flexible vibratory elements 52 and 54 adjacent the node points 60 and 62, respectively. Thus, by coaxially positioning the flexible tubular supports 100 and 101 about the vibratory elements 52 and 54, respectively, a suitable high pressure seal is provided which seals the interior of the apparatus 10 and thus the exterior of the material container (not shown), and yet does not interfere with the operation of the apparatus. It is particularly to be noted that the flexible tubular support members 100 and 101 will also transversely vibrate at their ends supporting the rods 52 and 54 to some extent rather than hold the support points 60 and 62 rigid which acts to allow the transverse vibrations which are imposed upon the vibratory elements 52 and 54 to pass through and not be blocked by the high pressure seals at points 60 and 62, which are generally a welded connection. The effect of the free ends of the tubular support members 100 and 101 transversely vibrating acts to avoid the blocking effect which occurs when a sturdy high pressure seal connection is made at the points 60 and 62. It is apparent that the interior of the housing structure 12, because of the sealing support at points 60 and 62, is closed off and secured from contact with the material to be measured.

In the embodiment of the invention shown in FIGURES 4 and 5, a single vibratory rod 110 may be used which is connected at one end to the paddle 50a, and at its second end is connected to both the extension 53a and the extension 55a. Similar to the embodiment of FIGURES 1–3, the apparatus of FIGURES 4 and 5 include a flexible tubular support member 112 which is fixedly secured at one end 114 to the central tubular portion 14, and its free end is sealably connected to the flexible vibratory element 110 adjacent the node point 116 of the natural resonant frequency of the element 110. And while the tubular support member 112 of FIGURES 4 and 5 or the tubular support members 100 and 101 of FIGURES 1–3 may be directed internally or externally of the housing 12, it is preferable that they be directed externally as shown in the embodiment of FIGURES 4 and 5 in order to avoid the possibility of the material entering the tubular support means and clogging up the space between the support means and the vibratory elements. Except for the fact that the sending and receiving signals are both transmitted over the same vibratory element 110, the structure and operation of the embodiment of FIGURES 4 and 5 is similar to that of FIGURES 1–3.

Referring to the embodiment of the invention shown in FIGURE 6, the flexible vibratory means may include two vibratory rods 70 and 72 of different natural resonant frequencies, the rods being longitudinally aligned and connected one to the other to form the vibratory means 111. Thus, rod 70 may be a solid cylindrical rod of a certain natural resonant frequency and the rod 72 may be a hollow tubular member of a lower natural resonant frequency. The rods 70 and 72 are longitudinally aligned and joined and sealed together by suitable means such as a sleeve 74 and may be suitably connected such as by welding. However, it is to be noted that a flexible tubular support member 90 is still provided and is suitably connected such as by welding to the vibratory element 111 to form a high pressure and material tight seal. Preferably, the supporting sleeve 74 is positioned at the node point of the tube 72 so as to provide maximum vibration. However, the actual purpose of the modified structure of FIGURE 6 is to provide a less sensitive but more powerful apparatus. That is, assume that the applied frequency of the electromagnetic driving coil 36b is 120 cycles per second, the natural resonant frequency of the rod 70 is 200 cycles per second, and the natural resonant frequency of the tube 72 is 120 cycles per second. Thus, as the apparatus is driven at a driven frequency of 120 cycles per second, the rod 70 will vibrate, but not at its resonance, and therefore is analagous to a lever arm vibrating the rod 72 about the fixed support point 92. While this structure is not as sensitive as the apparatus shown in FIGURES 1–5, it can be operated with more input power and thus can override error signals such as caused by vibration action of external effects, such as external vibrations and temperature changes on the rod 72. It is also to be noted that with the use of this structure the rod 72 may act as a material sensing means itself without the addition of a paddle and may reach further into the vessel containing the material (not shown). Furthermore, because of the shape of the rod 72, it is suitable for the addition of a suitable corrosive coating.

Thus, in any of the embodiments shown in FIGURES 1 through 6, the driving magnetic armature 56, 56a or 56b is vibrated causing a transverse vibration to pass through the flexible vibrating means to the material sensing means. A change in one of the physical characteristics of the material contacting the material sensing means will affect the vibration of the vibratory elements which will be detected by the change in vibration of the magnetic armature 58, 58a or 58b, respectively, in the detection assembly.

While it is apparent that a change in the physical properties such as density, specific gravity, or flow will affect the force of the material acting on the material sensing means 50 so as to change its vibration, the material sensing means 50 may be used to detect a change in temperature of the material. In use for measuring a change in temperature of the material contacting the material sensing means 50, the material sensing means 50 is made out of any material, for example steel, which will change size in response to changes in temperature and thus will give a change in its vibration on a change of temperature which can be readily detected.

Generally, in the operation of the present invention a suitable electric source is connected to the electrical conductors 41 and 44 and thus to the coil 35 which constitutes the motor or transverse vibratory means by which the vibratory armature 56 is caused to vibrate and in turn vibrates the extension 53. Thus, the armature 56 vibrates at the frequency of the applied electrical source and in turn in FIGURES 1 through 3 vibrates vibratory element 52, and in FIGURES 4 and 5 vibrates flexible element 110, and in the embodiment of FIGURE 6 vibrates flexible element 111. Thus, a vibration of the vibratory elements is transmitted from the armature 56 to the material contact sensing means such as 50 which is in position to be contacted by the material to be measured. The vibration of the material sensing means will also affect the vibration of the detector armature 58, in the case of FIGURES 1 and 3 through vibratory element 54, in the case of FIGURES 4–5 through vibratory element 110 and in the case of FIGURE 6 through element 111. Electromagnetic or pickup coil 38 thus generates a voltage caused by the generation of the generator armature 58 in the magnetic field of the permanent magnet 52. The signal from this detecting or pickup coil 38 is transmitted through electrical conductors 46 and 48 to any suitable type of electrical circuit having electrical indicating or control means such as a volt meter or a relay coil (not shown). Thus, the value or changes in physical properties of a material which contacts the material contact sensing means is reflected by the amount or the change in the vibration transmitted to the vibrating pickup armature 58.

It is to be particularly noted that the central tubular portion 14 of the apparatus 10 may be threadably connected or welded to a material container (not shown) so as to present a pressure tight connection. In addition, the flexible tubular support members 100 and 101 (FIGURES 1 through 3), member 112 (FIGURES 4 and 5), and member 90 (FIGURE 6) are sealably and fixedly secured at one end to the central tubular portion 14 of the housing 12 and are sealably connected at their other end to the flexible vibrating elements 52 and 54 (FIGURES 1 through 3) or 110 (FIGURE 4) and 111 (FIGURE 6). Thereby a high pressure seal is provided preventing the escape of high pressure, contaminating material, or other conditions to which the material is subjected in the material container. However, because of the cantilever type support of the tubular support members and of their slight flexibility, the transverse vibratory waves set up in the flexible elements will pass through the sealing connections which are preferably adjacent a node point of the flexible elements. Thus, a high pressure sealing connection may be maintained about the vibratory elements, but at the same time will not prevent the passage of transverse vibratory waves along the vibratory elements.

For greater sensitivity, the vibratory elements 52 and 54 (FIGURES 1–3) and 110 (FIGURES 4–5) may be vibrated at their natural resonant frequency. However, it has been found that external conditions or conditions other than that being measured such as external vibrations will also cause changes, which is undesirable, in the output signal due to the great sensitivity of this device. In that event, the embodiment as shown in FIGURE 6 may be used whereby more power may be put into a less sensitive unit which can avoid and thus not be affected by errors caused by such external effects. In that event, the vibratory element 111 may include a solid elongate rod 70 and a hollow tubular rod 72 which are longitudinally aligned and connected. Assuming that the driving frequency is 120 cycles per second, it is preferable that the rod 70 have a natural resonant frequency different from the driving frequency, but that the hollow and more flexible rod 72 have a natural resonant frequency equal to the driving frequency. Thus, more power can be used to drive the rod since it is not operated at resonance and will act more as a lever arm to vibrate the rod 72. However, the extra power transmitted to rod 70 will be transmitted to the rod 72 which is driven at approximately its resonance and with sufficient power enough to not be affected by the action of small external forces on the apparatus 10. It is also noted that the larger size of the hollow flexible rod 72 makes it ideal as a material sensing means and for many uses no additional paddle means 50 is required. In addition, the large shape of the rod 72 makes it ideal for placing a protective coating about its exterior. It is noted also that the rod 72 is suitably connected and supported by the end of the tubular support member 90 which acts as a flexible extension of the rod 72 so that the rod may vibrate around its end 92 of fixed connection to the housing 12. Preferably, the point of support and the connection of the members 70 and 72 together at the sleeve 74 is approximately a quarter wave length from the fixed end of the tubular support member 90 in comparison with the length of the rod 72.

The present invention, therefore, is well adapted to carry out the objects and attain the ends and advantages mentioned as well as others inherent therein. While presently preferred embodiments of the invention are given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. An apparatus for determining physical properties of a material comprising,
   a housing,
   flexible elongate vibratory means,
   a sealing support means supporting the vibratory means at a point intermediate its ends,
   said sealing means including a flexible tubular support member one end of which is adapted to be fixedly supported to the housing and the second end of which is sealably connected to the vibratory means thereby sealing the interior of the housing from the material,
   material contacting sensing means secured to the vibratory means on one side of the support point outside the housing,
   means on the second side of said support point in the housing adapted to transversely vibrate said vibratory means thereby transmitting transverse vibration to said material sensing means, and
   means on said second side of said support point for detecting a change in the vibration of the vibratory means.

2. The invention of claim 1 wherein the vibratory means includes,
   two vibratory rods having different natural resonant frequencies, said rods being longitudinally aligned and connected to form the vibratory element, the rod connected to the material sensing means having the lower natural resonant frequency.

3. The invention of claim 2 wherein one of the rods is a solid tubular metal rod and the second rod is a hollow tubular member.

4. The invention of claim 1 wherein the material contacting sensing means is of a material which changes size in proportion to changes in temperature.

5. The invention of claim 1 wherein the vibratory means includes,
   two vibratory rods parallel to and spaced from each other.

6. An apparatus for determining physical properties of a material comprising,
   a housing,
   a flexible vibratory element,
   sealing support means supporting the vibratory element at a point intermediate its ends,
   said sealing means including a flexible tubular support member having first and second ends and coaxially disposed about the vibratory element,
   the first end of said tubular support member adapted to be fixedly supported to the housing and the second end of said member being sealably secured to and supporting the vibratory element but otherwise free thereby sealing the interior of the housing from the material,
   material contacting sensing means secured to the vibratory element outside the housing on one side of the support point,
   means in the housing on the second side of said support point adapted to transversely and continuously vibrate said vibratory element thereby transmitting transverse vibration to the material sensing means, and
   means in the housing on said second side of said support point for detecting a change in the vibration of the vibratory element.

7. The invention of claim 6 wherein the vibratory element includes,
   two vibratory rods having different natural resonant frequencies,
   said rods being longitudinally aligned and connected together adjacent the support point to form a single elongate vibratory element.

8. The invention of claim 7 wherein,
   one of said rods has a natural resonant frequency substantially the same as the vibration frequency of the means adapted to vibrate the vibratory element, and
   the second of said rods has a natural resonant frequency substantially different from said vibration frequency.

9. An apparatus for determining physical properties of a material comprising,
   a housing,
   flexible elongate vibratory means,
   said means including two vibratory rods having different natural resonant frequencies, said rods being longitudinally aligned and connected together to form the vibratory element,
   a sealing support means supporting the vibratory element at a point intermediate its ends and adjacent the connection between the two rods,
   said sealing means including a flexible tubular support member one end of the which is adapted to be fixedly and sealably connected to the housing and the second end of which is sealably connected to the vibratory element adjacent the point of connection between the two rods thereby sealing the interior of the housing from the material,
   material contacting sensing means secured to one of said rods on one side of the support point outside said housing,
   means on the second side of the support point inside said housing for transversely vibrating the second rod thereby transmitting vibration to said material sensing means, and
   means inside said housing adjacent the second rod for detecting a change in the vibration of the vibratory element.

10. An apparatus for determining physical properties of a material in a container comprising,
    a housing adapted to be connected to the container,
    vibratory means, said means including two flexible elements, said elements supported at points intermediate their ends,
    material contacting sensing means secured to one end of each of the flexible elements for transmitting the vibration from one flexible element to the second flexible element, said material sensing means positioned outside of the housing and in said container,
    means in the housing for vibrating the second end of one of the flexible elements thereby vibrating the material sensing means and the second flexible element,
    means in the housing for measuring the change in vibration of the second end of the second flexible element,
    flexible tubular sealing means connected to the flexible elements at said support points and to the housing thereby sealing the interior of the housing from the material in the container.

11. An apparatus for determining physical properties of a material in a container comprising, a housing adapted to be connected to the container, vibratory means, said means including two elongate flexible elements, said elements having the same natural resonant frequency, means in the housing for continuously vibrating the first end of one of the flexible elements in a transverse direction, a material sensing means connected to the second end of each of the flexible elements, flexible tubular sealing means one end of which is sealably connected to the housing and positioned about said flexible elements and the second end is sealably connected to and supporting said flexible elements proximate a node point of the natural resonant frequency of the said elements thereby sealing the material in the container when the housing is connected to the container, and means in the housing adjacent the first end of the second flexible element for detecting a change in the vibration of the second element.

References Cited by the Examiner

UNITED STATES PATENTS

| | | | |
|---|---|---|---|
| 2,683,984 | 7/1954 | Boyle et al. | 73—59 |
| 2,839,915 | 6/1958 | Roth et al. | 73—59 |
| 3,100,390 | 8/1963 | Banks | 73—59 |

FOREIGN PATENTS 899,057  7/1944  France.

RICHARD C. QUEISSER, *Primary Examiner.*

JOHN P. BEAUCHAMP, *Examiner.*